United States Patent [19]
Patterson et al.

[11] Patent Number: 5,651,500
[45] Date of Patent: Jul. 29, 1997

[54] AUTOMATED FARMING SYSTEM

[76] Inventors: David Patterson, Rte. 1, Box 1186, Paul, Id. 83347; David Green, 2041 Lund, Bancroft, Id. 83217

[21] Appl. No.: 579,939

[22] Filed: Dec. 28, 1995

Related U.S. Application Data

[63] Continuation of Ser. No. 134,576, Oct. 7, 1993, abandoned.
[51] Int. Cl.$^6$ .................................................. A01G 27/00
[52] U.S. Cl. ...................... 239/69; 239/73; 239/155; 239/726; 324/427
[58] Field of Search .......................... 239/67, 69, 70, 239/72, 73, 155, 726, 723; 180/165, 167; 324/427; 320/48

[56] References Cited

U.S. PATENT DOCUMENTS

| | | | |
|---|---|---|---|
| 3,297,254 | 1/1967 | Coffman | 239/63 |
| 3,400,891 | 9/1968 | Mattwell | 239/66 |
| 3,723,753 | 3/1973 | Davis . | |
| 3,726,477 | 4/1973 | Shapiro | 239/70 |
| 3,902,668 | 9/1975 | Daugherty et al. | 3/12 |
| 4,059,227 | 11/1977 | Hunter | 12/12 |
| 4,085,769 | 4/1978 | Van Haaften . | |
| 4,095,050 | 6/1978 | Beachem et al. | 179/2 A |
| 4,185,650 | 1/1980 | Neves et al. | 239/69 |
| 4,209,131 | 6/1980 | Barash et al. | 239/69 |
| 4,274,583 | 6/1981 | Hunter | 25/16 |
| 4,291,837 | 9/1981 | Gheen | 239/70 |
| 4,626,984 | 12/1986 | Unruh et al. | 239/69 |
| 4,637,547 | 1/1987 | Hiniker et al. | 239/155 |
| 4,673,128 | 6/1987 | Keller et al. | 25/16 |
| 4,684,920 | 8/1987 | Reiter | 239/69 |
| 4,729,224 | 3/1988 | McAteer | 21/4 |
| 4,760,547 | 7/1988 | Duxbury | 239/69 |
| 4,763,836 | 8/1988 | Lyle et al. | 239/69 |
| 4,838,310 | 6/1989 | Scott et al. | 31/2 |
| 4,985,638 | 1/1991 | Brock | 47/14 |
| 5,022,585 | 6/1991 | Burgess | 7/30 |
| 5,048,755 | 9/1991 | Dodds | 12/12 |
| 5,333,785 | 8/1994 | Dodds et al. | 239/67 |
| 5,337,957 | 8/1994 | Olson | 239/69 |

*Primary Examiner*—Andres Kashnikow
*Assistant Examiner*—Lisa Ann Douglas
*Attorney, Agent, or Firm*—Workman, Nydegger & Seeley

[57] ABSTRACT

A system and method for operating various farming devices at a location remote from the device. A hand-held radio transmitter is programmed to transmit Dual Tone Multiple Frequency tones in specific patterns so as to communicate directions to a controller located at the power plant of the farming device. The controller is formed by a companion microprocessor which is used to receive and decode and also encode and transmit Dual Tone Multiple Frequency tones, and a primary microprocessor which is used to monitor decoded Dual Tone Multiple Frequency tones and then control the power plant and transmission of the farming device. Directions transmitted from the hand-held radio transceiver to the controller can, in various embodiments of the present invention, direct such functions as, for example, moving of an irrigation wheel-line, turning off and on the engine of the wheel-line, starting and stopping pumps of a pump system, monitoring the moisture levels in soils.

4 Claims, 18 Drawing Sheets

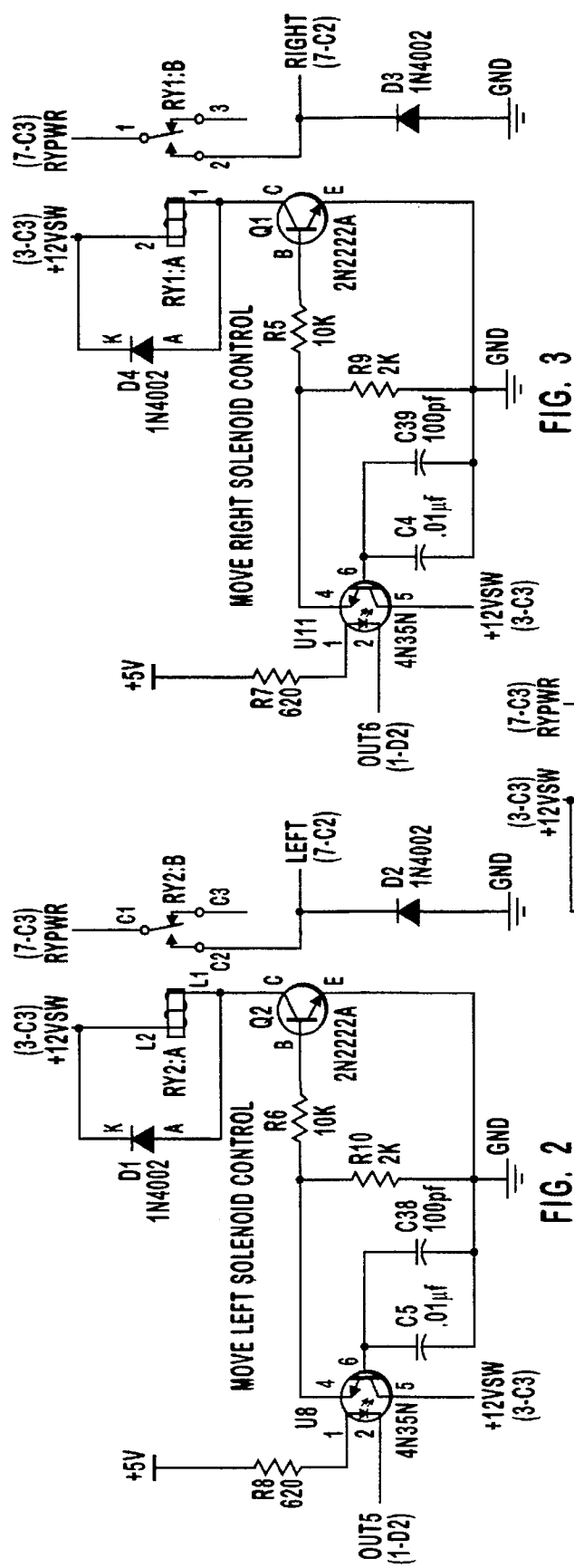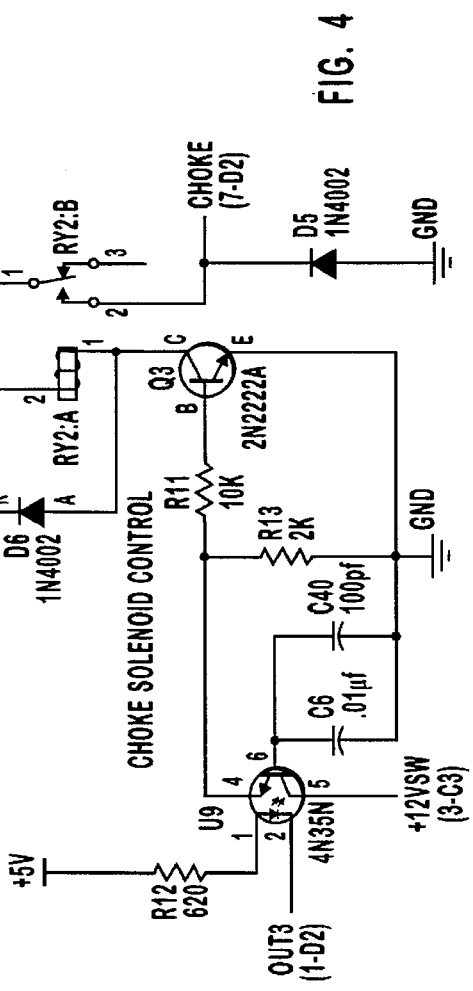
FIG. 2
FIG. 3
FIG. 4

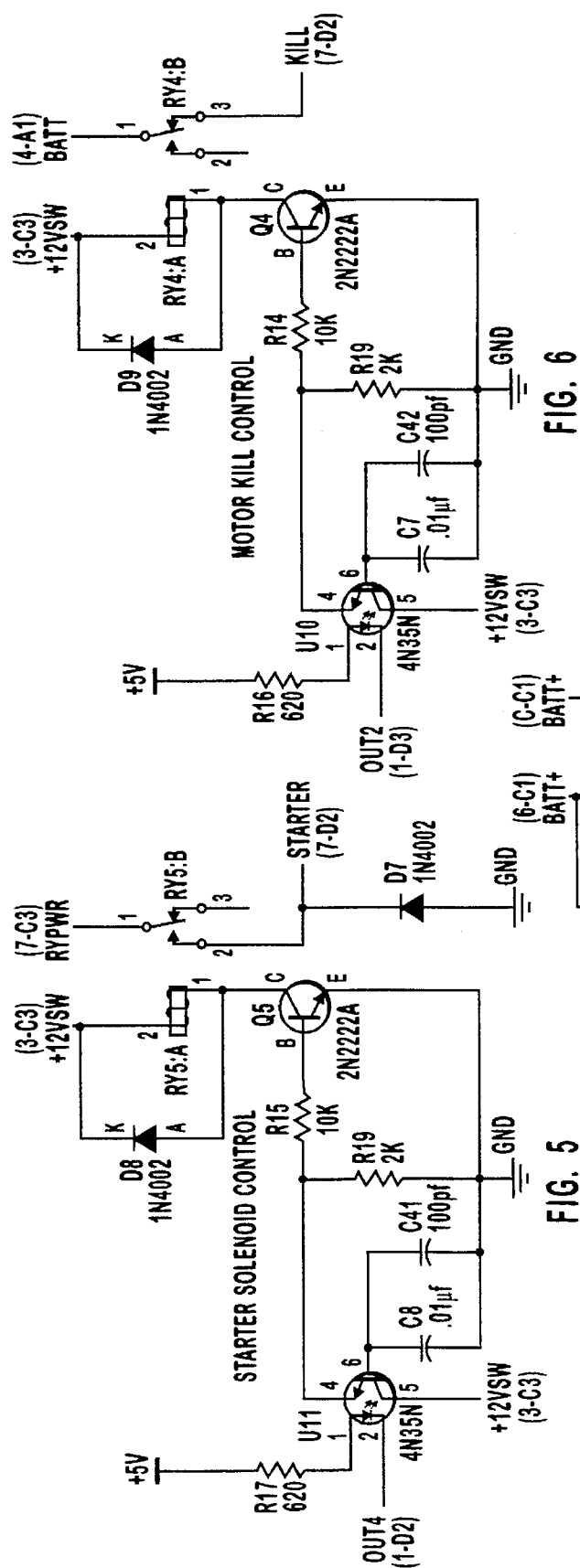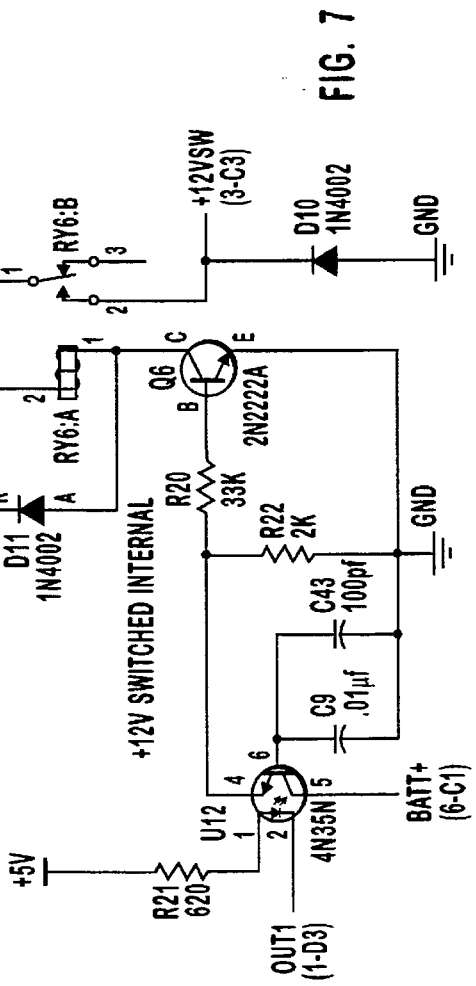
FIG. 5
FIG. 6
FIG. 7

AUTOMATED FARMING SYSTEM

This application is a continuation of U.S. application Ser. No. 08/134,576, filed Oct. 7, 1993 now abandoned.

BACKGROUND

1. Field of the Invention

The present invention relates to an automated farming system. More particularly, the present invention relates to an irrigation system which can be controlled from a remote location through radio transmissions.

2. Prior State of the Art

In today's world of agriculture, farms are typically large. In order for the farmer to be able to control all farming operations, he or she must travel to each site in order to manually operate the various pieces of equipment. Often, time is wasted travelling from one place to another. For example, on a farm with several hundreds or thousands of acres, it may take hours for the farmer to travel to each area in order to determine whether enough water is being evenly distributed, whether the soil is being appropriately nourished, whether the irrigation systems are working properly, whether all the pumps have been turned on, etc. Even if the job is split between several people, many man hours are necessarily consumed.

Irrigation of the fields is one area much time and effort is expended in order to operate the various irrigation equipment. For example, a wheel line is commonly used to irrigate large fields. The wheel line is moved through the fields by a wheel mover system. The mover itself is mounted on a tube which also serves as a frame. On either end of the tube is an axle having wheels attached thereto. The unit propels itself by use of hydraulic pumps, gears, and valves.

Typically, a pumping station distributes water through a main line. Wheel lines are connected to the main line at one end and extend various distances away from the main line. When a new irrigation set is to be irrigated, the wheel lines are disconnected from the main line, rotated throughout the field, and then re-connected to the main line at the new location. Unfortunately, this process is laborious and time consuming. In order to be able to move the wheel lines to new areas, the wheel line must be turned off and disconnected from the main line. An operator must then walk from the main line to the center where the mover is located in order to move the wheel line to a new position in the field. The operator must then walk back to the main line, re-connect and pressurize the wheel line. Much time is consumed by the operator in walking back and forth. Further, the crop cover and soil conditions of the area may make walking difficult and inconvenient.

A further problem with the irrigation systems used today is the inability to quickly restart all the water pumps at once. For example, power outages resulting from storms often cause the water pumps to be accidentally or automatically turned off. If these pumps are not restarted within a certain time period, the water pressure in the system drops, thus making it difficult to repressurize the system. Therefore, after a storm or power outage, someone must quickly drive to each pump station in order to restart the pumps before an excessive drop in pressure can occur.

BRIEF SUMMARY AND OBJECTS OF THE INVENTION

It is an object of the present invention to provide an apparatus which reduces the manual time and effort necessary for operating irrigation equipment.

It is a further object of the present invention to provide an apparatus which decreases the need for constant traveling between each of the fields within a farm.

Another object of the present invention is to provide an apparatus which allows the remote operation of irrigation equipment from central locations.

Still another object of the present invention is to provide a method for controlling irrigation equipment from a central location while reducing the necessary manual labor.

An additional object of the present invention is to provide an apparatus for irrigation of fields which can be automatically started and stopped without unnecessarily consuming many man hours.

A further object of the present invention is to provide a method for monitoring the operation of machinery from a central location away from the machinery.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a remote controlled farming system is disclosed herein. Receiving means, integrated into a power plant of the farming device, for receiving and implementing directions such that operation of the farming device can be remotely controlled is provided. Also provided is means for transmitting directions to the receiver means from a remote location.

The means for transmitting directions to the receiver means comprises a hand-held radio which can send tones to the receiver means in order to transmit messages to be followed by the farming device. The receiver means comprises a primary microprocessor designed for monitoring the directions and controlling the power plant of the farming device. The receiver means further comprises a companion microprocessor designed for receiving and decoding the directions, and encoding and transmitting the directions to the farming device.

Messages sent from the hand-held radio to the receiver means allows a variety of farming devices such as irrigation wheel lines, pressure monitors, pump stations, etc. to be controlled from areas remote from the device itself. The system allows a large saving in man hours and labor and reduces the need for travelling long distances to operate each device.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which:

FIG. 2 illustrates the presently preferred circuitry of the move left solenoid control.

FIG. 3 illustrates the presently preferred circuitry of the move right solenoid control.

FIG. 4 illustrates the presently preferred circuitry of the choke solenoid control.

FIG. 5 illustrates the presently preferred circuitry of the starter solenoid control.

FIG. 6 illustrates the presently preferred circuitry of the motor kill control.

FIG. 7 illustrates the presently preferred circuitry of the device for switching battery voltage to all the internal relays.

DETAILED DESCRIPTION OF THE PREFERRED EMBODIMENTS

Figure 1:
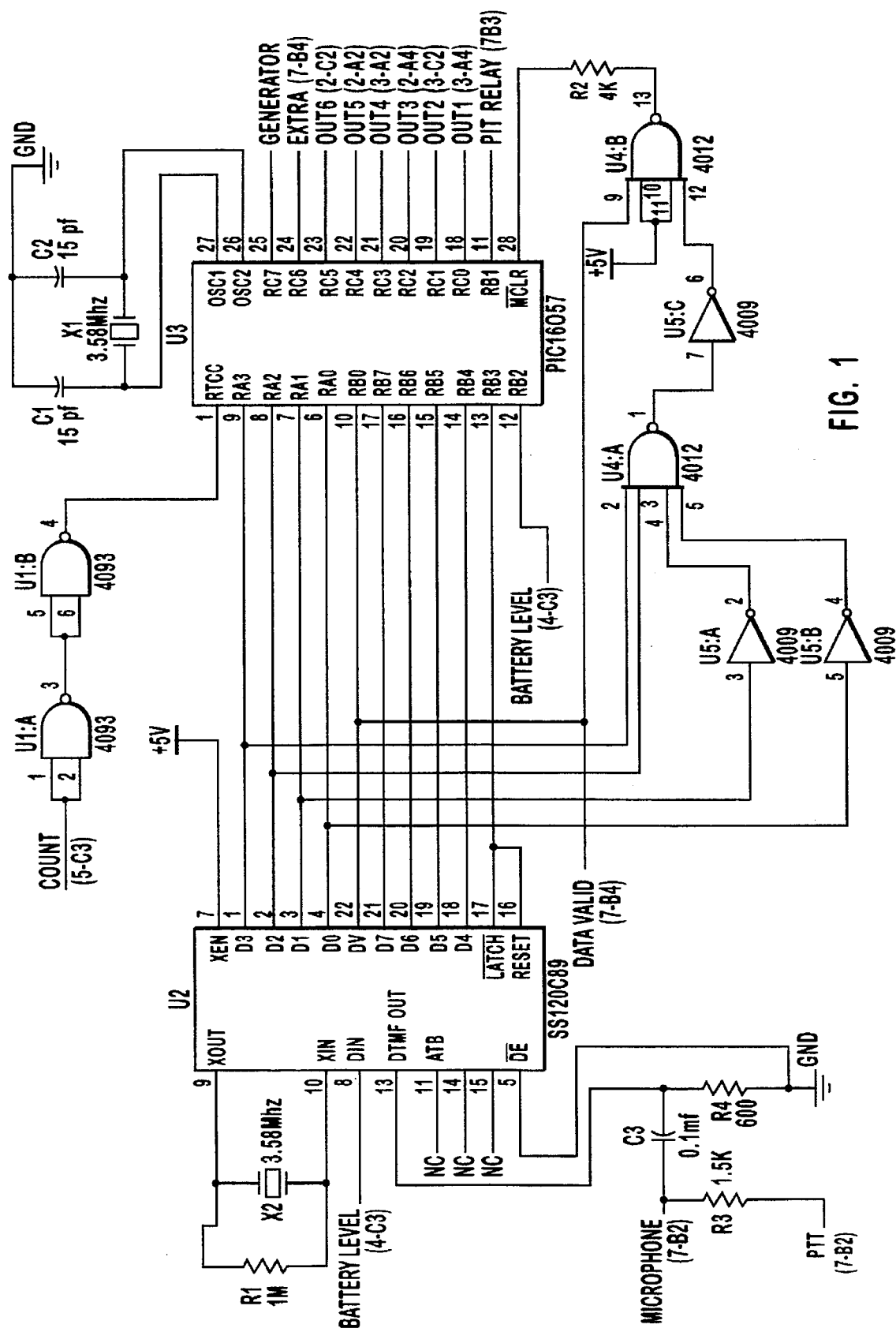
FIG. 1 illustrates the presently preferred circuitry of the primary microprocessor and the companion microprocessor which form the receiving means of the present invention.

The present invention relates to a remote controlled farming system. More particularly, the present invention relates to a remote controlled irrigation and sprinkling system wherein control of a typical wheel-line can be performed from a central location away from the wheel-line, such that much time and labor is saved.

The present invention utilizes hand-held radios to communicate with and remotely control various pieces of farming equipment. For example, the present invention can be used to control the power plant and transmission of an irrigation wheel-line. Although many types of farming equipment can be remotely controlled by the system of the present invention, the wheel-line irrigation system will be described in detail as one example of use.

The present invention is comprised of two components. The first component comprises directing means for transmitting information to the farming device. The second component comprises receiving means, integrated into the power plant of the apparatus, for accepting information from the directing means and relaying back information from the apparatus to the directing means. Both components are operated through the transmission and reception of Dual Tone Multiple Frequency (DTMF) tones. These are the typical tones generated when dialing a typical touch-tone telephone.

In the presently preferred embodiment within the scope of the present invention, the directing means comprises a hand-held radio. The presently preferred hand-held radio is a commercially available UHF radio transceiver which is equipped with an optional DTMF 12-key keypad. The keypad provides the keys 0–9, *, and # for use in transmitting information. In the presently preferred embodiment, the radio transceiver in use is the Patriot™ hand-held by Ritron®. Other legally licensed radio transceivers with appropriate FCC Type Approval may also be used.

The directing means is typically enclosed within protected housing. In the present preferred embodiment, the housing comprises a plastic NEMA IV box-shaped enclosure. Also contained within the box-shaped enclosure is circuitry necessary for transmitting information from the hand-held receiver to the receiving means and for obtaining information from the receiving means in return. It can be appreciated that the housing for the hand-held receiver can be various other forms and can either be permanently positioned or mobile. When the housing is placed in an area of the wheel-line system which will become wet, the housing will be water tight. The enclosure may be equipped with a quick-disconnect socket for the wiring harness connecting the housing with the equipment being controlled on the power plant.

The directing means may optionally include or interface with circuitry for synthesizing speech. With such a combination, the controlling means could report the status of functions being carried out by the system in spoken commands. Not only that, but the language of the spoken commands could be selected. However, in the presently preferred embodiment, the status of functions being carried out by the system are reported back through the controlling means by means of DTMF tones, as discussed in more detail below.

In the present invention, the second component, the receiving means, is designed around a single-chip controller or microprocessor of the type having use in many areas of industry. The receiving means is located on the farming device itself, usually at the power plant of the device. As can be seen illustrated in FIG. 1, the presently preferred embodiment of the receiving means comprises a primary microprocessor 50, also labelled U3, and a companion microprocessor 52, also labelled U2. The circuitry associated with the primary microprocessor 50 and the companion microprocessor 52 is also illustrated in FIG. 1.

In a presently preferred embodiment within the scope of the present invention, the primary microprocessor 50 used is the PIC 16C57 by Microchip®, which has been previously used, for example, in anti-lock braking systems in the automotive industry. Other similar types of microprocessors may also be utilized.

One advantageous aspect of primary microprocessor 50 is its low power consumption. Primary microprocessor 50 along with all of its associated circuitry consumes less than 100 ma while in standby mode. Because of this low power consumption, a lead acid battery, of the variety typically used in the wheel-lines, can be used to power primary microprocessor 50. The battery of the wheel-line will not be drained between each daily use of the wheel-line's power plant. Depending upon the size of the battery, the microprocessor can run for many days on the battery without the battery having to be recharged. Then, when recharging is necessary, the engine of the wheel line can be started and run while the battery recharges.

It can be appreciated that one option within the scope of the present invention would be to program the microprocessor to self-start the wheel-line's engine and recharge the battery when the battery has become too discharged. This feature is later discussed in more detail.

In primary microprocessor 50 of the presently preferred embodiment of the present invention, 20 independent Input/Output (I/O) lines are provided that can be assigned either an input or an output role. All 20 of the available I/O lines are utilized in implementing control of the wheel-line.

THE PRIMARY MICROPROCESSOR

As illustrated in FIG. 1 for the remote control of a wheel-line irrigation system, each pin performs the functions as described below.

Located on the wheel line is a distance-traveled transducer. The transducer can be, for example, either an optically-isolated interrupter module or a magnetic switch, both of which count rotations of the wheel-line so that the appropriate circuitry and operator can monitor how far the wheel-line has moved. Other transducers which count rotations of the wheel-line may also be used, but the presently preferred embodiment utilizes a magnetic proximity switch to detect and count the rotations of the wheel line. Pin 1 receives pulses from the wheel line's distance-traveled transducer and allows the receiving means to stop the wheel line's motion before exceeding a predetermined maximum distance. Thus, the distance that the wheel line is moved can be remotely controlled.

Pins 6–9 constitute a 4-bit data bus (D0–D3 of companion microprocessor 52) that receive DTMF codes from companion microprocessor 52 into primary microprocessor 50, allowing primary microprocessor 50 to know which key on the hand-held radio has been pressed by the operator.

Pin 10 serves as an input from companion microprocessor 52 and is used to monitor a signal called Data Valid (DV). When DV is a logic 1, primary microprocessor 50 has been told that a valid tone has been received.

Pin 11 is used to control a Push-To-Talk (PTT) relay that activates the transmitter on the hand-held radio to talk DTMF tones back to the operator.

Pin 12 input monitors the wheel-line's battery level. If a logic 1 is present, then the battery voltage is greater than 11.6 volts. If a logic 0 is present, then the battery is less than 11.6 volts and the battery needs recharging. To recharge the battery, the motor of the wheel-line is turned on and allowed to run for the appropriate period of time.

Pin 13 serves as an output to companion microprocessor 52 and is used to control whether companion microprocessor 52 talks DTMF codes to primary microprocessor 50 or listens to DTMF codes from primary microprocessor 50. DTMF codes heard by companion microprocessor 52 from primary microprocessor 50 are modulated by companion microprocessor 52 into true DTMF tones that are transmitted via the radio link back to the operator.

Pins 14–17 constitute a 4-bit data bus (D4–D7 of companion microprocessor 52) that output DTMF codes from primary microprocessor 50 to companion microprocessor 52 to cause companion microprocessor 52 to modulate tones into the transmitter of the hand-held radio, via a microphone input of the hand-held radio.

Pin 18 serves as an output to activate, via an optical isolator, the internal 12 volt power used to enable all relays used for controlling the wheel-line's engine and transmission.

Pin 19 serves as an output to activate, via an optical coupler, the engine's kill switch.

Pin 20 serves as an output to activate, via an optical isolator, the engine's choke solenoid.

Pin 21 serves as an output to activate, via an optical coupler, the engine's starter solenoid.

Pin 22 serves as an output to activate, via an optical coupler, the wheel-line's transmission "move-left" solenoid.

Pin 23 serves as an output to activate, via an optical coupler, the wheel-line's transmission "move right" solenoid.

Pin 24 serves as an input, and depending upon options chosen by the customer, monitors either a motor temperature transducer or a tamper switch indicating illegal entry into the system controller housing.

Pin 25 serves as an input and monitors a generator sensing circuit which allows primary microprocessor 50 to know if the engine is running or not.

Pins 26–27 are conned to a crystal oscillator of primary microprocessor 50. In the presently preferred embodiment, the crystal frequency chosen for this invention is 3.579545 Mhz (Color Burst Frequency). Two 15 pf capacitors are connected to the two pins to complete the oscillator for primary microprocessor 50.

Pin 28 is the master RESET input for primary microprocessor 50. Pin 28 connects to a special circuit that forces a reset condition every time the operator presses the # key.

THE COMPANION MICROPROCESSOR

In the presently preferred embodiment, companion microprocessor 52 is a SSI 2089 model. Other comparable microprocessors are also within the scope of the present invention.

Companion microprocessor 52 is specifically designed and programmed to perform all the tasks related to receiving and decoding DTMF tones, as well as encoding and transmitting DTMF tones. Companion microprocessor 52 relieves primary microprocessor 50 from the burden of processing DTMF codes. This frees primary microprocessor 50 for use as the primary controller, monitoring decoded DTMF codes and then controlling the wheel-line's power plant and transmission. Each pin of companion microprocessor 52 performs the functions as described below.

Pin 1–4 constitute a 4-bit output bus which presents decoded DTMF codes for primary microprocessor 50 to collect and analyze.

Pin 5 acts as a tri-state input to connect or disconnect the DTMF code bus of pins 1–4 to and from primary microprocessor 50. In the presently preferred embodiment, Pin 5 is connected directly to ground so as to permanently enable pins 1–4 to connect to primary microprocessor 50.

Pin 7 connects to the positive power supply. In the preferred embodiment, 5.0 Volts regulated is used.

Pin 8 receives audio DTMF tones from the hand-held radio transceiver. Pin 8 has been capacitively coupled to a 0.01 µf capacitor. This protects companion microprocessor 52 from excessive DC voltage spikes.

A system crystal, X1, a 3.579545 Mhz color burst crystal and a parallel 1 Mohm resister is connected between Pins 9–10. Proper operation of the chip requires this frequency.

Pin 11 provides an expansion clock for external expansion. Its frequency is a precise division by 8 of the crystal frequency.

From Pin 13, encoded DTMF tones are output to the hand-held radio transmitter allowing the receiving means to "respond" to the operator. Various tones in varying sequences are transmitted to convey controller conditions to the operator.

On Pin 16, the presence of a logic 1 disables DTMF tone generation within companion microprocessor 52. Pin 16 is tied to Pin 17 in this design to allow external control of the transmitting of DTMF tones.

On Pin 17, the presence of a logic 1 to a logic 0 transition causes the DTMF code on Pins 18–21 to be taken into companion microprocessor 52 and consequent generation of DTMF tones to result.

Pins 18–21 constitute a 4-bit input bus for DTMF codes coming from primary microprocessor 50.

Pin 22 is an output called DATA VALID. Pin 22 tells primary microprocessor 50 when companion microprocessor 52 has decoded an incoming DTMF tone into a valid DTMF code. This allows the primary microprocessor 50 to collect the code and react to the control meaning that particular code conveys to the program running in the primary microprocessor 50.

A reset circuit is provided between primary and companion microprocessors to provide for an externally forced reset on primary microprocessor 50 whenever the operator begins to react with the receiving means. As can be seen in FIG. 1, a circuit comprised of U4 and U5 is connected between pins 1–4 of companion microprocessor 52, which form the decoder output bus, and pin 28 of primary microprocessor 50, the master reset input. This circuit only detects the presence of DTMF code of the # key. It doesn't detect the presence of any other DTMF code. Upon detection of the # key transmitted from the operator's hand-held radio, the output on pin 13 of U4:B goes to a logic 0. This forces a reset condition in primary microprocessor 50. The program stored in primary microprocessor 50 must therefore begin anew at the ultimate beginning point.

The 50 ohm resistor in series with pin 13 of U4:B and the pin 28 of primary microprocessor 50 assists in current limiting the active low signal entering primary microprocessor 50.

As can be seen in FIG. 1, there are 6 primary output connections coming from primary microprocessor 50 which are used to activate control circuitry essential to the remote operation of the wheel-line. These output connections are pins 18–23 of primary microprocessor 50. Pins 19–23 are especially important in that they remotely start and stop the gasoline engine and cause the power plant's hydraulic transmission to move the wheel-line forward or backward.

Pins 19–23 of primary microprocessor 50 control the engine and transmission through optically isolated relays. Turning now to FIGS. 2–7, the circuitry utilized to control the motion of the wheel-line is illustrated. The technique of optical isolation is used to protect the low voltage circuitry in the controller from potentially dangerous outside voltages.

In FIG. 2–3, the optical isolators are labelled U8 for the move left solenoid control and U7 for the move right solenoid control. As all the motion control circuits operate in a similar manner, only the circuit of U8, the move left solenoid control illustrated in FIG. 2, will be discussed in detail.

In the case of U8, a 4N35N, pins 1 and 2 provide access to an infrared light emitting diode (LED). This LED, when activated, forward biases into saturation the companion photo transistor, accessible through pins 4,5, and 6. Resistors R6 and R10 are attached to pin 4, the emitter of the optical isolator's photo transistor. Resistors R6 and R10 provide a forward and cut-off bias voltage to NPN transistor Q2 as the photo transistor in U8 saturates or goes into cutoff. Transistor Q2 and the photo transistor in U8, along with their +12 volt power supply are isolated from the +5 volt supply via the infrared light beam emitted by the LED in U8.

A 0.01 µf capacitor C5 and a parallel 100 pf capacitor U38 connected between the base of the photo transistor and ground serves to bypass to ground unwanted signals that could inadvertently activate the photo transistor.

When transistor Q2 goes into saturation, becoming essentially a short between the collector and emitter, a current path is provided for relay coil RY2:A. When this occurs the normally opened contacts in RY2:A close. As a result, the electromagnetically activated spool in the hydraulic valve is moved in such a way as to allow the hydraulic transmission to move the wheel line in one direction.

When Q2 is forced into cutoff, becoming essentially an open between the collector and emitter, the coil in RY2:A is de-energized. This allows the hydraulic valve to return to a neutral position wherein the transmission is prevented from moving the wheel-line.

Diodes D1 and D2 are wrapped around the relay and solenoid coils to absorb the reverse surge currents that result when power is removed from the coils. Without these diodes, particularly D1, transistor Q2 could be damaged or destroyed from this reverse surge current. Diode D2 prevents arcing across the switch contacts of RY2:A when its reverse surge current occurs. Without this protection, relay switch contacts could soon be badly pitted or burned.

The remaining output control circuits found in this design operate in exactly the same manner as just described. The only differences are in what type of device is activated by the isolated relay's contacts. The device may be a move right solenoid control as illustrated in FIG. 3, a choke solenoid as illustrated in FIG. 4, a starter solenoid as illustrated in FIG. 5, a kill switch as illustrated in FIG. 6, or a device for switching battery voltage to all the internal relays as illustrated in FIG. 7.

There are three essential functions of the wheel-line apparatus that are monitored by the system of the present invention to enable it to properly operate. First and most important, is the ability to know when the gasoline engine is running. This is accomplished by sensing the voltage created by the gasoline engine's generator.

The second essential function is to monitor how far the wheel-line actually moves. Should the hand-held radio initiate wheel-line motion and be unable to stop it because of a dead battery or loss of communication, it is essential to have the wheel-line stop itself after a maximum safe distance has been traveled. This is accomplished with the use of a sensor that counts revolutions of the wheel line.

Thirdly, it is useful to know, depending on which option a customer chooses, either the temperature of the gasoline engine for better self-starting, or whether someone has unwarrantedly opened the housing that holds the controller and radio transceiver. This is an optional tamper condition. These conditions are announced to the operator via DTMF tones when initial operation is attempted.

Figure 8:
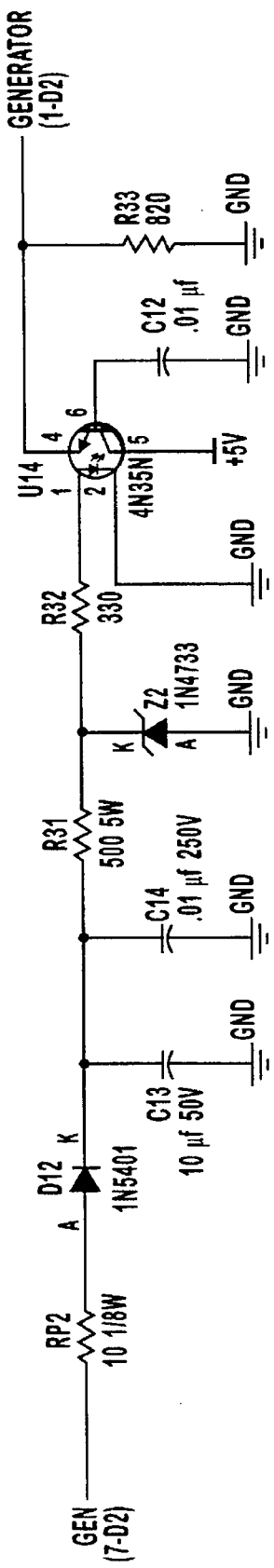
FIG. 8 illustrates the presently preferred circuitry of the sensor circuitry used to detect when the engine is running.

The sensor circuitry used to detect when the gasoline engine is running is illustrated in FIG. 8. As mentioned, this is accomplished by detecting the presence of voltage from the gasoline engine's generator—used to charge the power plant's lead acid battery. The circuit is comprised of a simple power supply design that regulates the generator's noisy DC output to a clean 5 volt signal. Diode D12, a typical power supply rectifier, allows only positive voltage to be utilized. Capacitors C13 and C14 smooth ripples and noises in the rectified voltage. Then, through resistor R31, a 5 volt Zener diode is activated resulting in a clean +5 volt signal. The resulting +5 volt signal activates, through resistor R32, another 4N35 optical isolator (U14), thus providing an isolated input signal to primary microprocessor 50.

Figure 9:
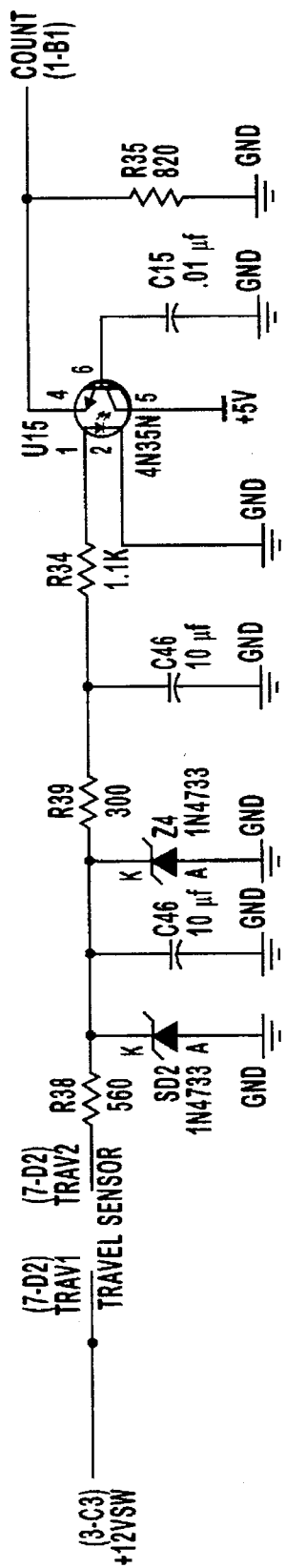
FIG. 9 illustrates the presently preferred circuitry of one embodiment of the travel sensor.

One embodiment of the distance-traveled sensor that prevents excessive wheel-line travel is illustrated in FIG. 9. In the preferred embodiment, a magnet is mounted to the primary gear of the wheel-line, and a magnetic pick up, such as a magnetic proximity switch is mounted adjacent the primary gear of the wheel-line. On each revolution of the wheel-line as the magnet moves past the magnetic proximity switch, the travel sensor provides a switched voltage to the optical isolator U15. This isolated pulse is then conditioned by the schmitt trigger gates U1A and U1B (see FIG. 1) to provide the primary microprocessor 50 a reliable single pulse per rotation of the wheel-line. Components SD2, Z4, C46, C47 and associated resistors provide a noise filter which prevents unwanted noise from creating false pulses to the main microprocessor. Pin 1 on primary microprocessor 50 is designed for typical pulse counting and has special software provisions available to the programmer.

Figure 10:
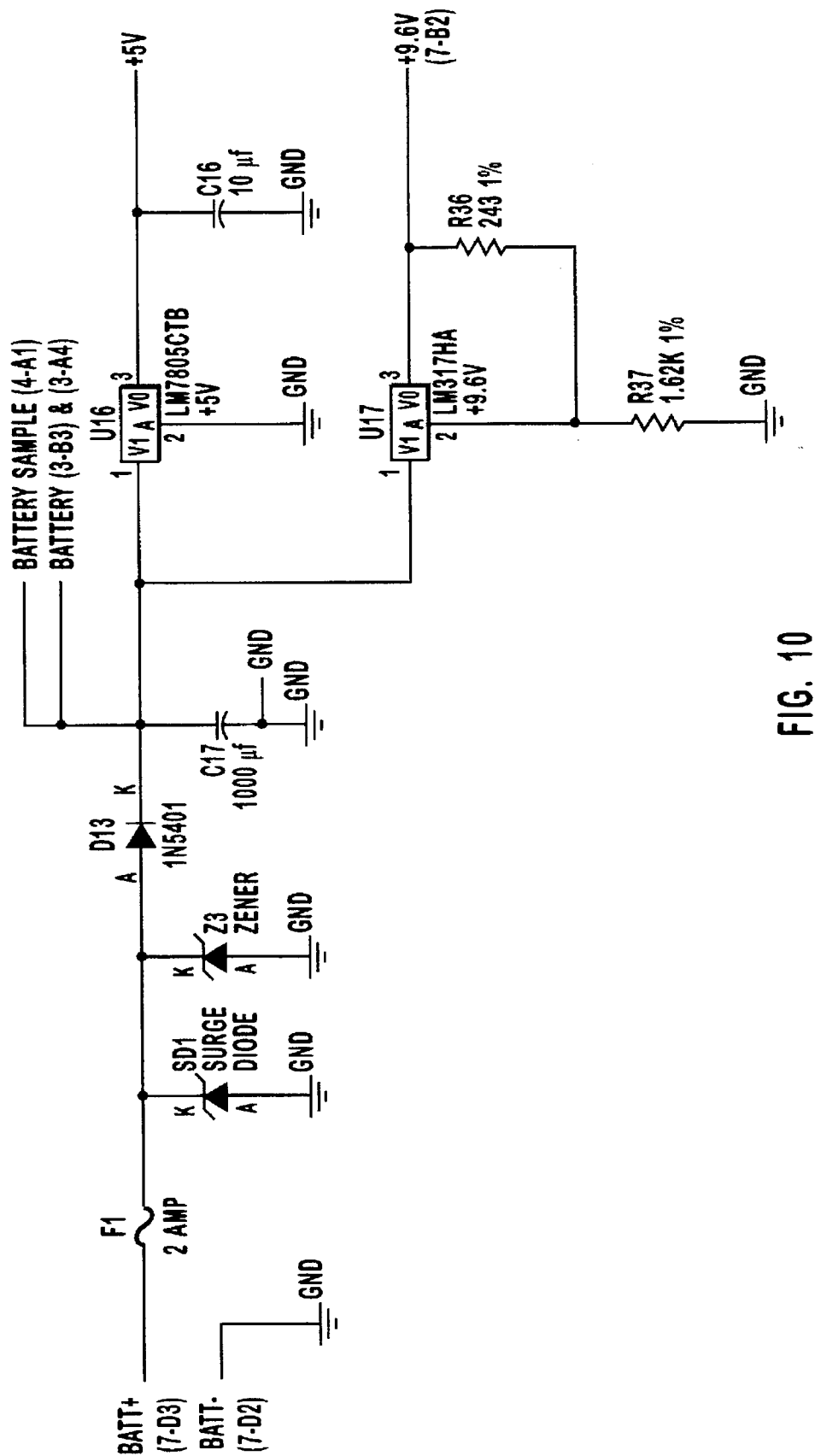
FIG. 10 illustrates the presently preferred circuitry of the power supply of the present invention.

The power supply for this invention is derived from the wheel-line's 12 volt lead acid battery. As shown in FIG. 10, two 3-terminal regulators, U16 and U17, are used to generate the internal +5 volt and +9.6 volt DC supplies. Both 3-terminal regulators (U16 & U17) are capable of providing adequate current for the circuitry they supply.

U17 has voltage setting resistors R36 and R37 which are selected to power the radio transceiver associated with the controller circuit. If a different radio is utilized, the values of these two resistors can easily be changed to match the voltage requirements of that new radio.

U16 provides a well-regulated +5 volt supply for all the CMOS circuitry utilized in the controller as well as the 5 volt PTT relay U12. Both U16 and U17 utilize heat sinks to maintain a proper operating temperature range. Both U16 and U17 contain short-circuit protection features which should prevent any excessive component damage in the event of circuit failure. As an extra precaution, a 2 amp fuse, or optional circuit breaker, is inserted in series with the battery's positive lead to insure that catastrophic circuit failures will not result in melted or burned components.

A Diode D13 is a high wattage rectifier installed in series with the power lead so as to prevent component damage if the positive and negative battery leads are reversed. A Zener Z3 acts like a Metal Oxide Varistor (MOV) surge protector to limit the positive voltage entering the power supply to +27 V DC. Because the response time of Z3 can be too slow for extremely steep voltage transients, a surge diode SD1 is added in parallel to Z3 to capture those fast voltage spikes. A capacitor C17 provides a voltage smoothing effect and together with Z3, SD1 and D13 constitute an effective guard against static voltage hits on the wheel-line's power system, including strikes by lightning.

Figure 11:
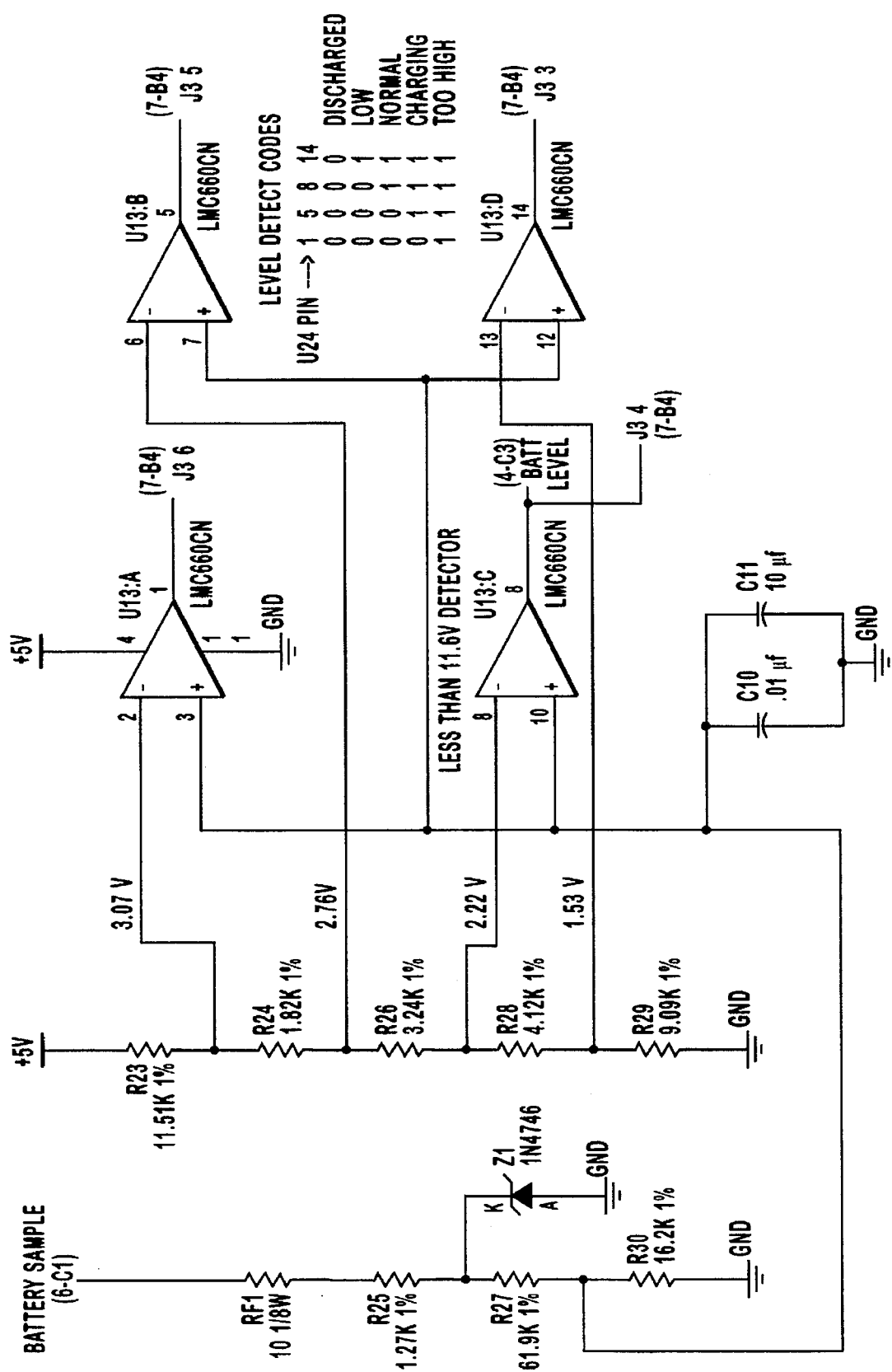
FIG. 11 illustrates the presently preferred circuitry for detecting the battery level of the farming apparatus.

FIG. 11 illustrates the circuitry for detecting the level of the wheel-line's battery. A detector U13:C detects whether the voltage is less than 11.6 V. If the voltage is too low, the operator can then transmit instructions to the wheel-line to turn on its motor in order to recharge the battery.

Figure 12:
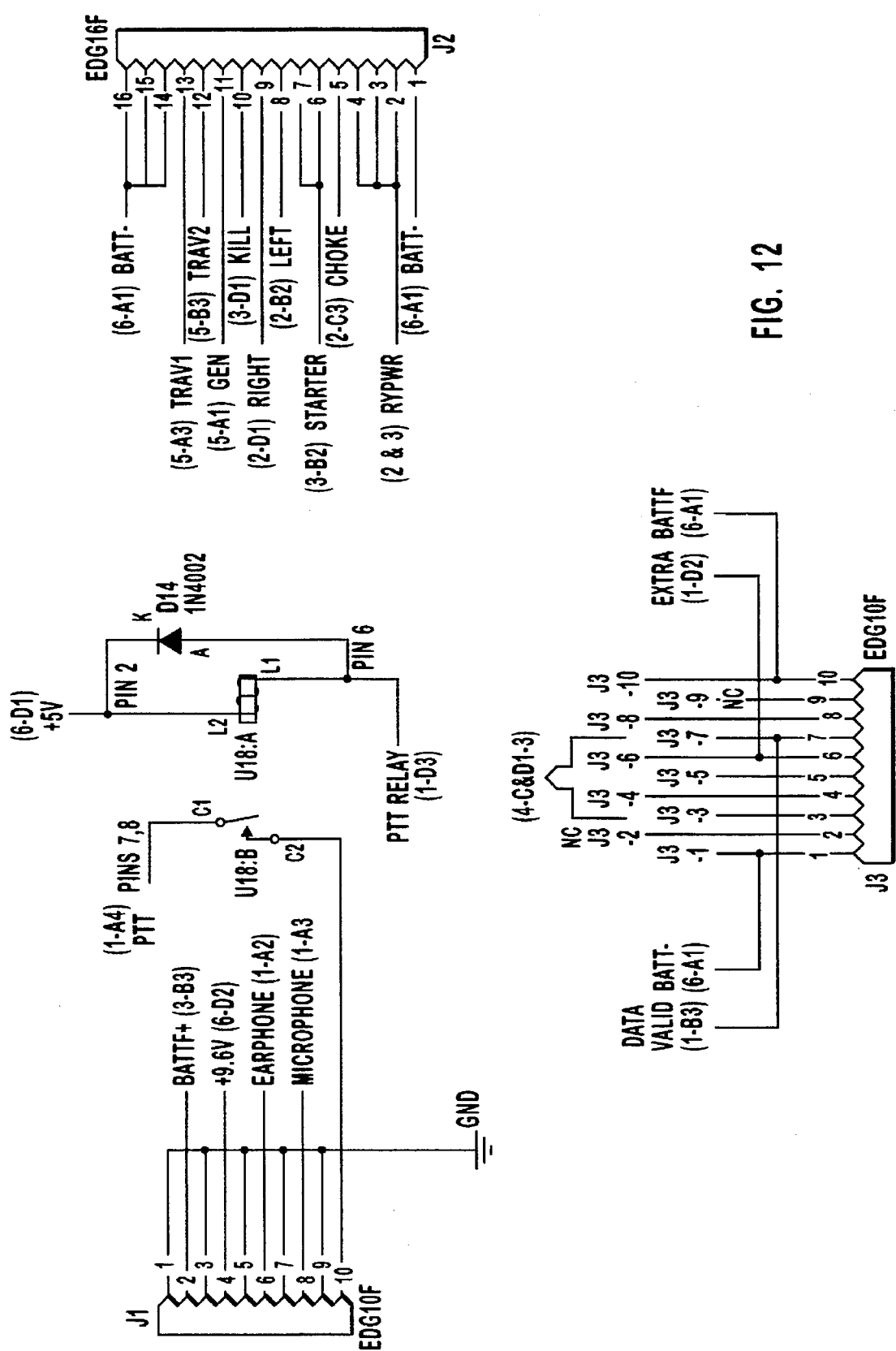
FIG. 12 illustrates the wiring connections from the primary and companion microprocessors to the wheel-line's gasoline engine and transmission and the hand held radio.

Turning now to FIG. 12, the wiring connections, from the primary and companion microprocessors to the wheel-line's gasoline engine and transmission, are illustrated. Sixteen gauge wire is used to guild the wiring harness to accommodate relay and solenoid currents. The label J2 indicates the wire numbers connecting to the various parts of the wheel-line's power plant. It should be noted that most of the connections to the power plant assume a good, (external to the controller housing), chassis ground connection for those solenoids that control motion, the choke and starter solenoids. The kill switch does not utilize such a ground connection. The kill switch acts only as an in-line series switch with the gasoline engine's magneto wiring.

All necessary wiring connecting the primary and companion microprocessors with the gasoline engine and hydraulic transmission is bundled into a wiring harness. One end of the harness has wires terminated in easy-to-connect screw terminals which will accommodate field retrofitting of this invention to wheel-lines already in service.

Figure 13:
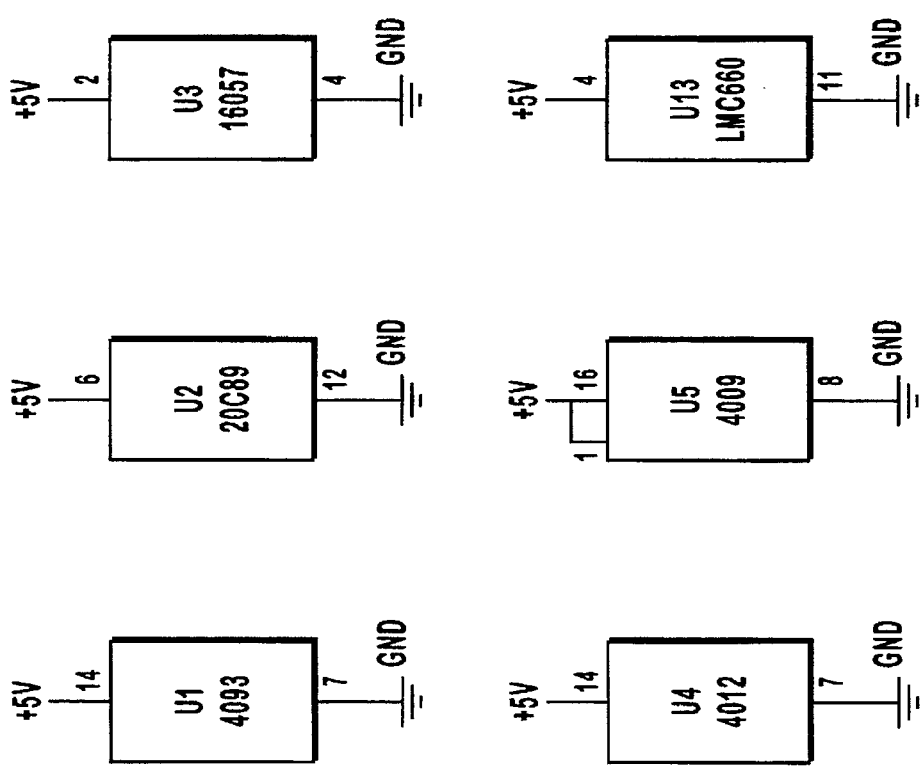
FIG. 13 illustrates the specific power and ground connections used in the presently preferred embodiment of the present invention.

FIG. 13 illustrates the specific power and ground connections used in the presently preferred embodiment of the present invention.

FIRMWARE OPERATION

The computer program stored in the controller's primary microprocessor orchestrates the overall behavior of the controller circuitry.

The computer program can perform the following tasks:
1) Scanning the radio (via the DTMF 4-bit bus) for key presses at the remote hand-held radio.
2) Upon receiving a valid key code, performing the intended tasks dictated by the logic in the firmware.

Examples:
a. Checking to see if a valid 4 digit SECURITY CODE was entered by the operator. This prevents random noise from activating the unit.
b. Checking to see if a valid 3 digit UNIT CODE was entered by the operator. This unit code is the "number" of the wheel-line being controlled.
c. Assuming valid security and unit codes, auto-starting the gasoline engine and enabling motion control of the wheel-line.
d. Upon receipt of the key code for 1, activating the hydraulic transmission and allowing motion in one-direction, up to a distance limit.
e. Upon receipt of the key code for 3, activating the hydraulic transmission and allowing motion in the opposite direction, up to a distance limit.
f. Upon receipt of the key code for 2, forcing a neutral condition in the hydraulic transmission thus stopping the wheel-line's motion.
g. Monitoring the battery level and announces via DTMF tones a normal or discharged battery level to the operator.
h. Detecting an enclosure tamper condition and announces via DTMF tones this condition to the operator.
i. Upon receipt of the key code for #, resetting the controller for receipt of a fresh security code and unit code. Also, if the gasoline is still running, activates the kill switch to shut off the motor.

The flow charts in FIGS. 14–25 indicate the presently preferred method of operation of the components of the system previously discussed. The flow charts of FIGS. 14–26 are representations of the steps carried out in the programming code utilized by the microprocessor included in the embodiment.

Figure 14:
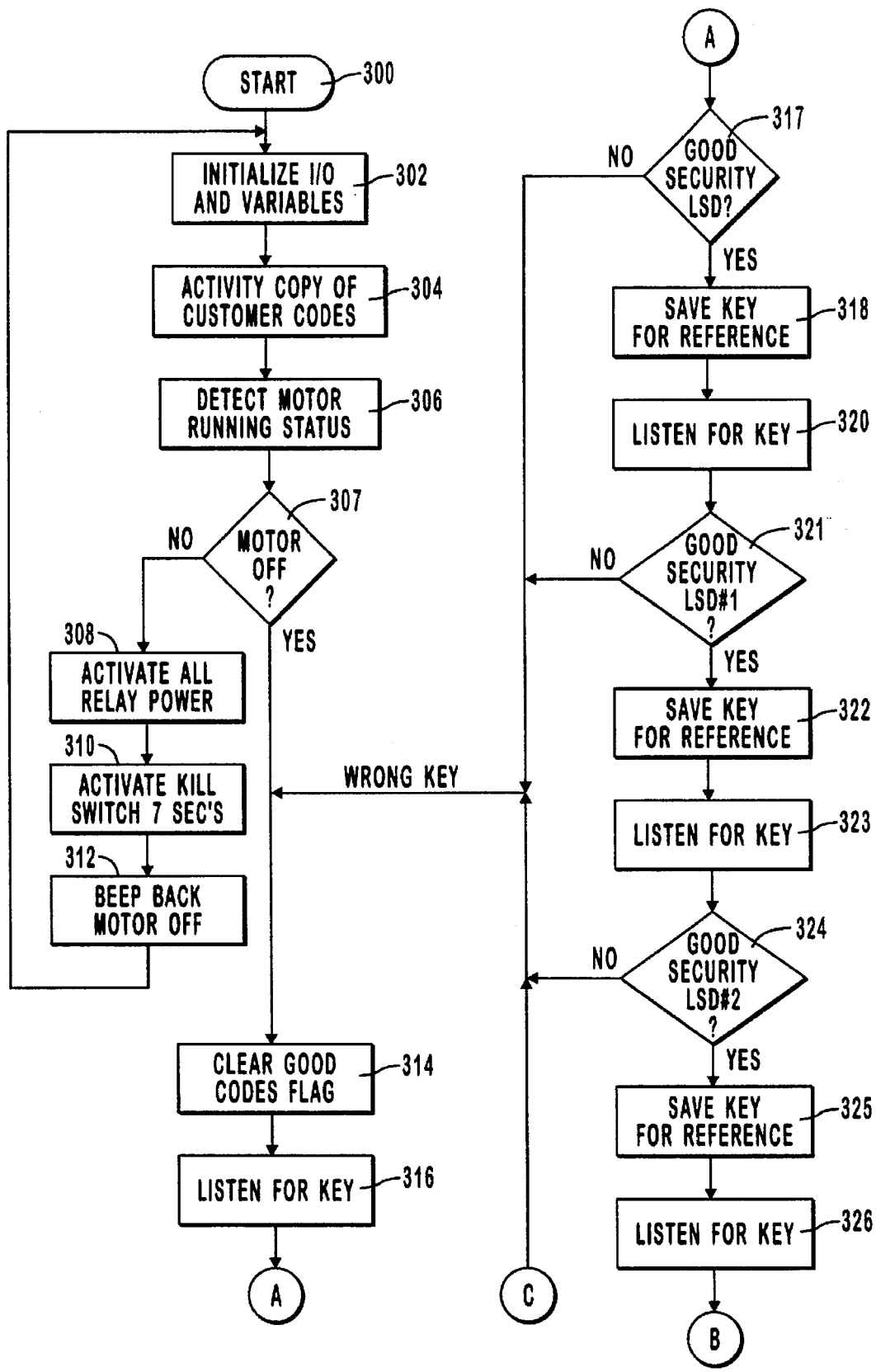
FIGS. 14–26A illustrate the presently preferred steps carried out in the programming code utilized by the microprocessors of the present invention.

First, represented in FIG. 14 is a start vector 300 at which the program flow begins. In step 302, the input/output and variables are initialized (later discussed in FIG. 22). In step 304, the copy of customer codes is activated. The next step, represented by boxes 306 and 307, determines whether the motor is running. If the motor is not off, step 308 activates all relay power, step 310 activates the kill switch for seven seconds, and step 312 beeps back information that the motor is off. Once this step is completed the steps begin again at step 302 which is to initialize input/output and variables. If the motor is off at step 307, the next step is step 314 which is to clear good codes flag and the listen for a key in step 316. (Listening for a key is later discussed in FIG. 20.)

The next steps of the program comprise checking, in step 317, whether there is good security LSD. If yes, then step 318 saves the key for reference and step 320 listens for a key. Again, the question is asked in step 321 if there is good security LSD number one. If yes, step 322 saves the key for reference and listens for a key in step 323. In step 324 the question is asked if there is good security LSD number two. If yes, then step 325 saves the key for reference and step 326 listens for a key. If the answer was no to any of the questions in steps 317, 321, and 324 as to whether there is good security LSD, the program is routed back to step 314 which is to clear good codes flag and then to step 316 which is listen for a key. At that point, the program begins again at step 317.

Figure 14A:
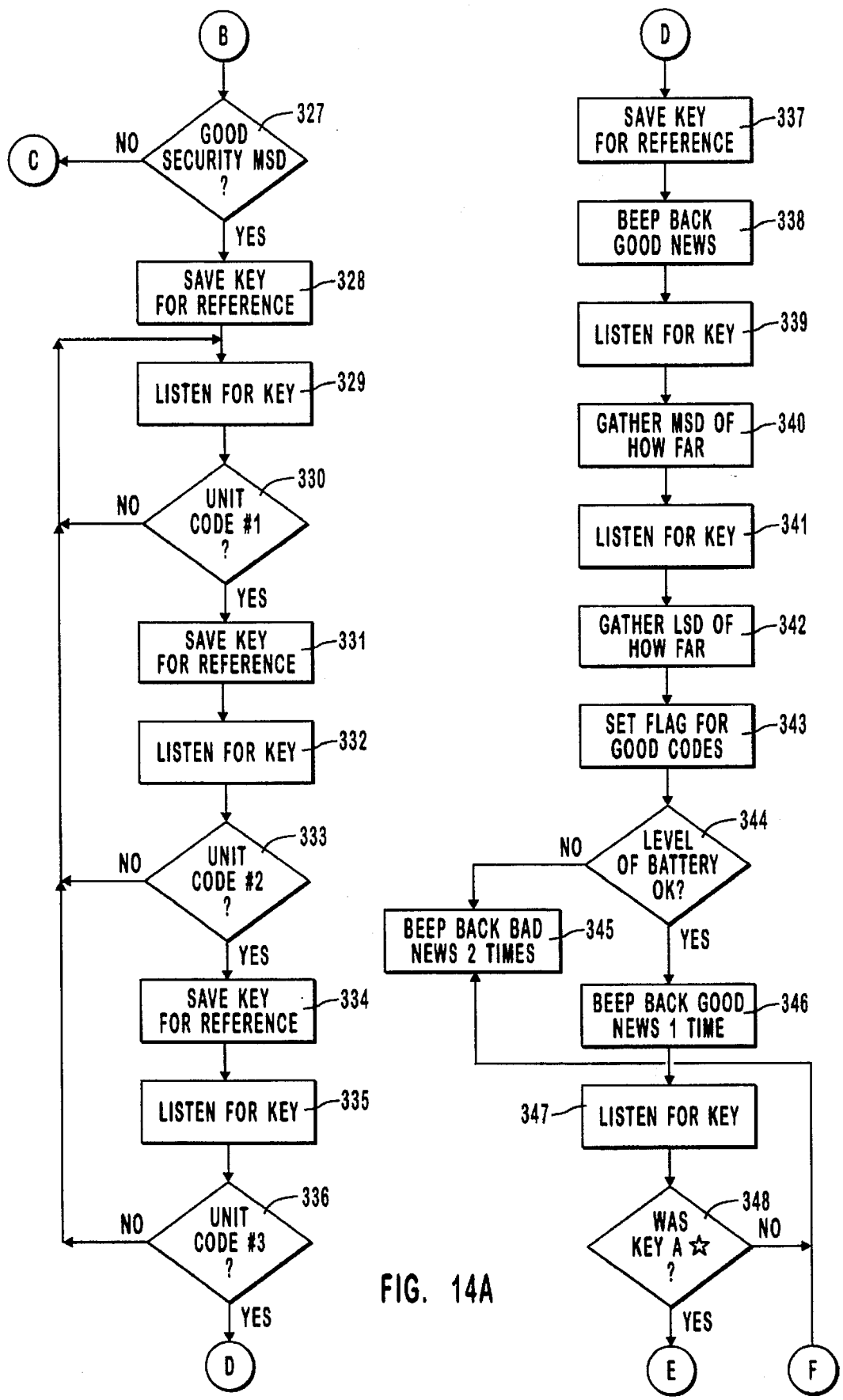

Referring now to FIG. 14A, after step 326, step 327 asks if there is good security MSD. If not, the program returns to step 317. If yes, step 328 saves the key for reference, step 329 listens for the key, and then step 330 asks whether unit code #1 is OK. If no, the program returns to step 329. If yes, step 331 saves the key for reference and step 332 listens for another key. In step 333, the question is asked whether unit code #2 is OK. If no, the program returns to step 329. If yes, step 334 saves the key for reference and step 335 listens for a key. The pattern continues with steps 336–339 for unit code #3. Step 327 and the steps following step 327 can be seen in FIG. 14A.

In step 340, MSD is gathered and step 341 listens for a key. Step 342 gathers LSD and step 343 sets a flag for good codes. In step 344, the level of the battery is checked. A low level causes bad news to be beeped back two times in step 345. (Later discussed in FIG. 15.) A good level causes good news to be beeped back one time in step 346. (Later discussed in FIG. 16.) After either step 345 or 346, step 347 listens for a key. If the key was not an *, the program returns to step 347. If the key was an *, all relay power is then activated in step 349, as shown in FIG. 14B.

Figure 14B:
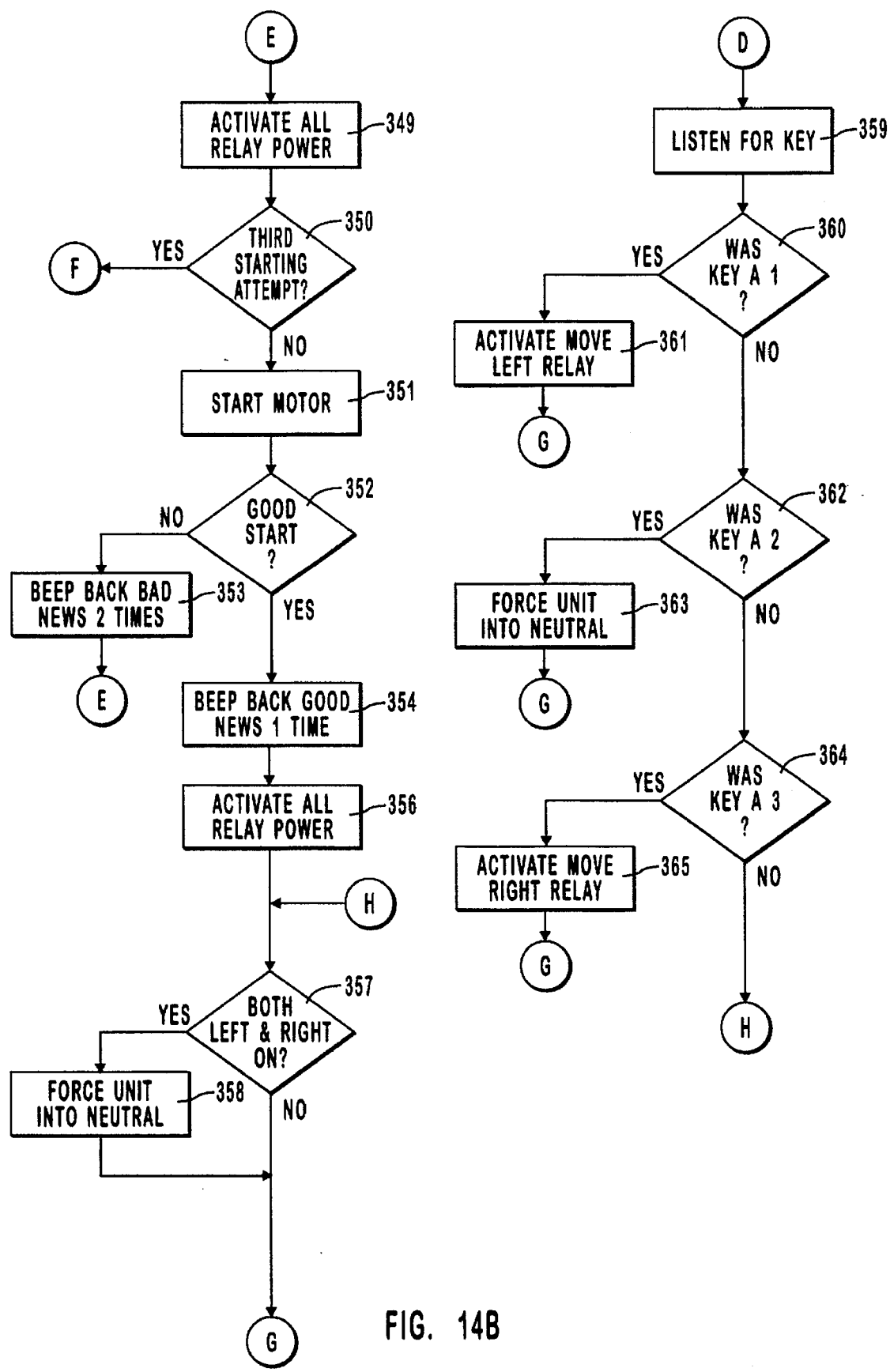

As can be seen in FIG. 14B, steps 350–358 relate to starting the motor. In step 357, the question is asked whether both the left and right relays are on. If yes, step 358 forces the unit into neutral and then moves to step 359 which listens for a key. If both the left and right relays are not on, the program continues directly to step 359 where it listens for a key.

After listening for a key, step 360 then determines if the key was a 1. If so, then step 361 activates the move left relay and then the program returns to step 359. If not, then step 362 determines whether the key was a 2. If so, step 363 forces the unit into neutral and the program returns to step 359. If not, then step 364 determines whether the key was a 3. If so, then step 365 activates the move right relay and the program returns to step 359. If not, the program returns to step 357 and continues.

Figure 15:
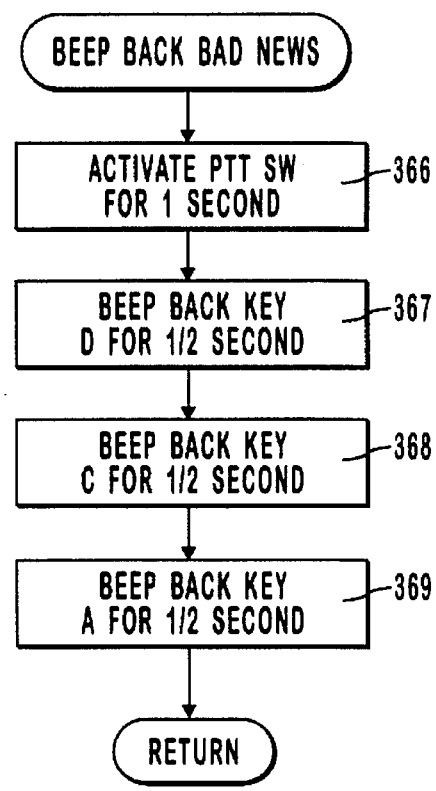
Figure 16:
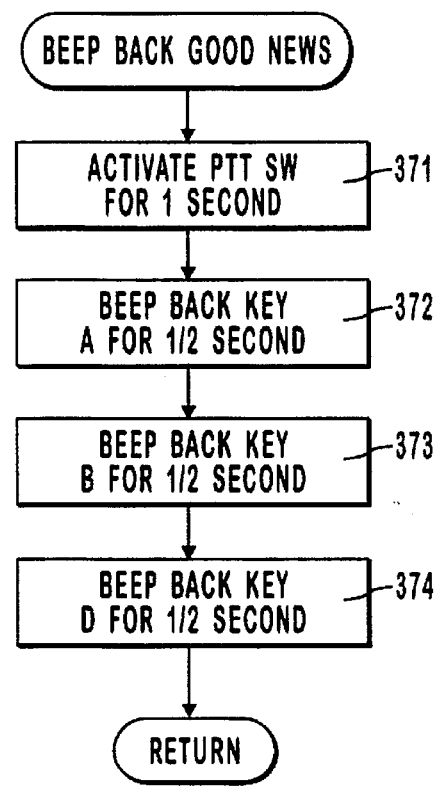
Figure 17:
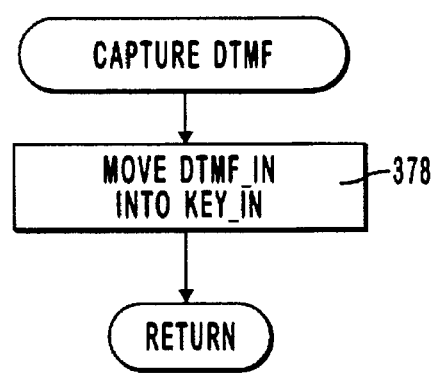

With reference to FIG. 15–16, the flow charts for beeping back good news, as in step 354 of FIG. 14B, for example, and for beeping back bad news, as in step 353 of FIG. 14B, for example, can be seen. FIG. 15 illustrates steps 366–369 in the flow chart for beeping back bad news. FIG. 16 illustrates steps 371–374 in the flow chart for beeping back good news. Further, in FIG. 17, step 378 to capture DTMF tones is illustrated.

Figures 18, 19:
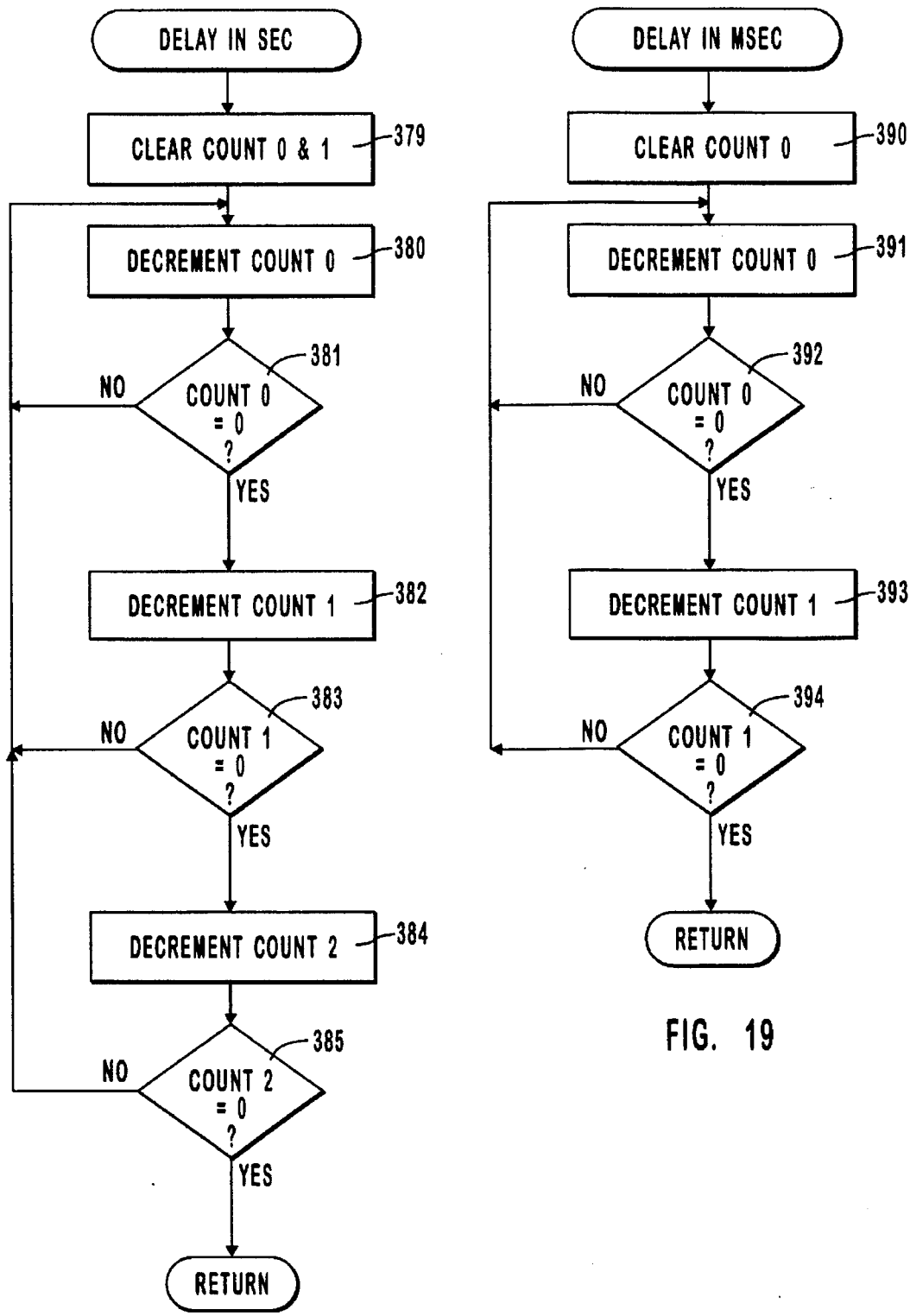

FIGS. 18 and 19 illustrate a delay in seconds, steps 379–385, and a delay in milliseconds, steps 390–394, respectively.

Figure 20:
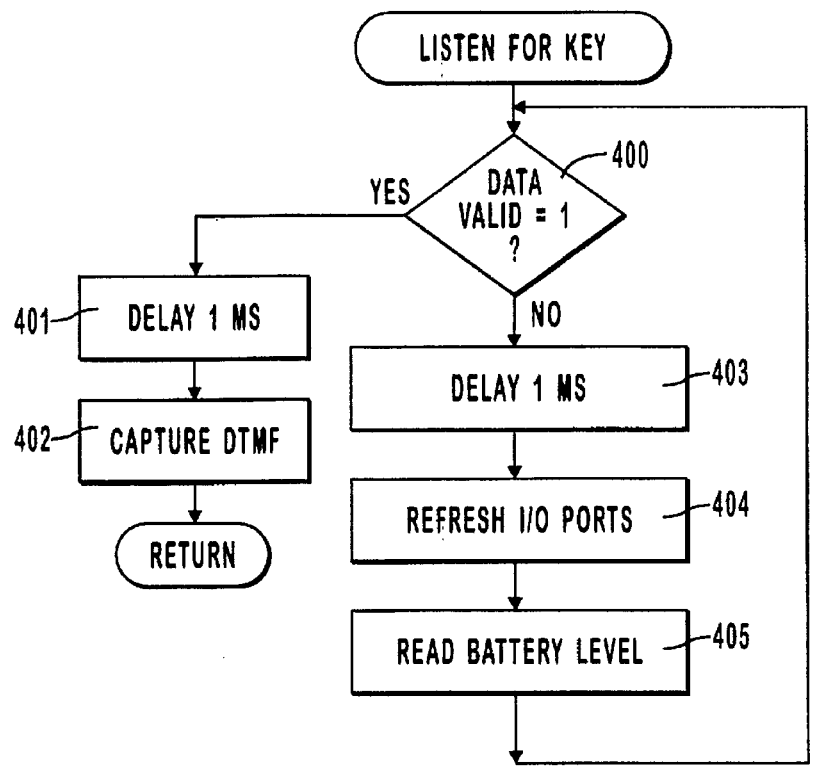

FIG. 20 illustrates the flow chart for listening for a key. In step 400, the question is asked whether data valid=1. If yes, then step 401 delays 1 msec and step 402 captures the DTMF tones. If no, then step 403 delays 1 msec, step 404 refreshes the input/output ports, and step 405 reads the battery level to see whether or not the battery is low.

Figure 21:
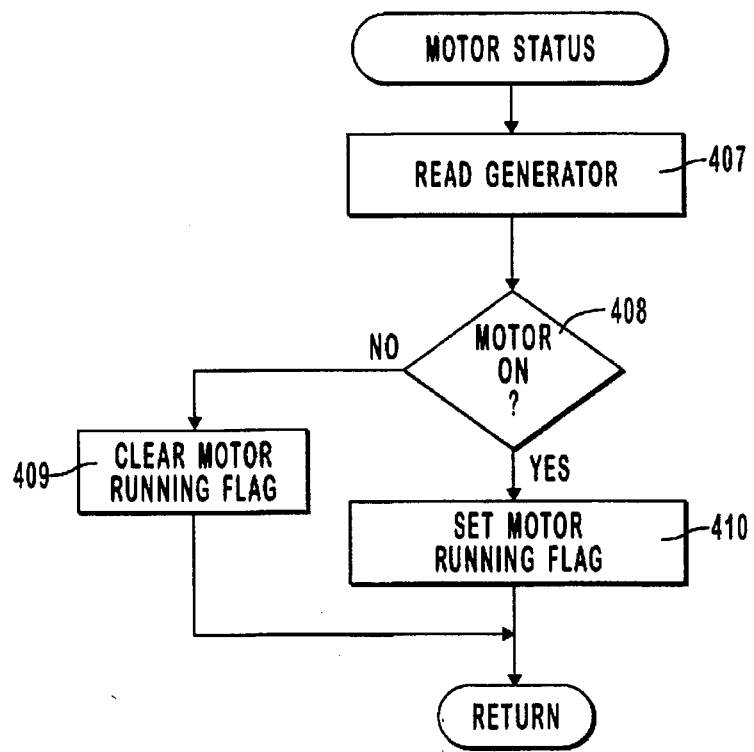

FIG. 21 illustrates the steps for indicating the motor status. In step 407, the generator is read. Step 408 then determines whether or not the motor is on. If not, the motor running flag is cleared. If yes, the motor running flag is set.

Figure 22:
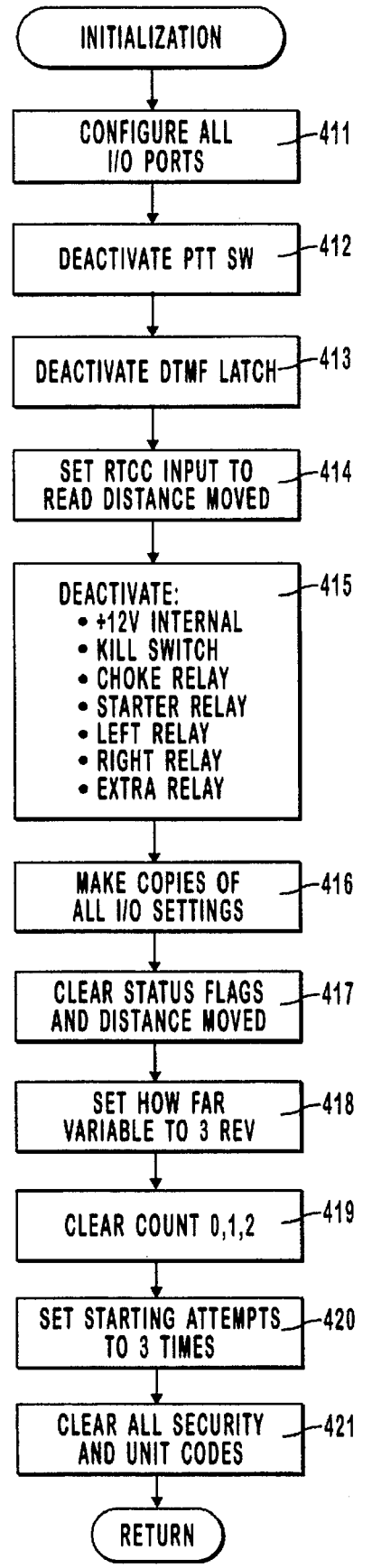

With reference now to FIG. 22, initialization, as earlier mentioned in step 302 of FIG. 14, is illustrated. Steps 411–421 indicate the steps for initializing the input/output and variables.

Figure 23:
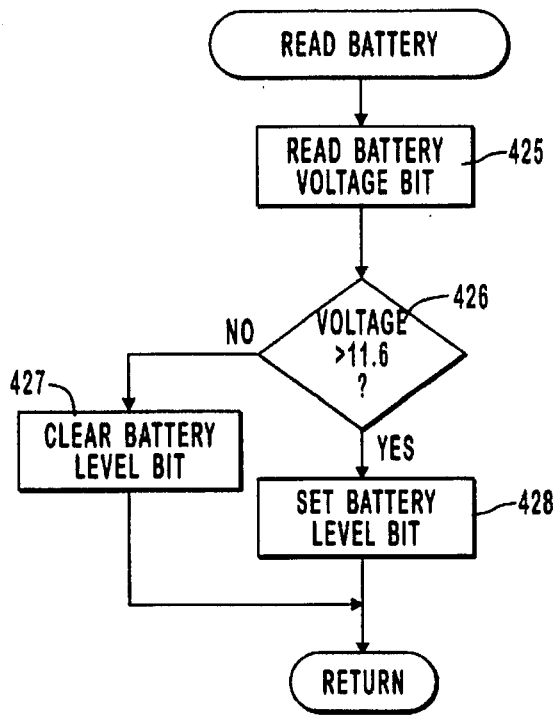

FIG. 23 illustrates the steps of monitoring the battery, as in, for example, step 405 of FIG. 20. In steps 425–428, it is determined whether the voltage of the battery is greater than 11.6. If the battery is found to be low, then the motor can be started in order to recharge the battery.

Figure 24:
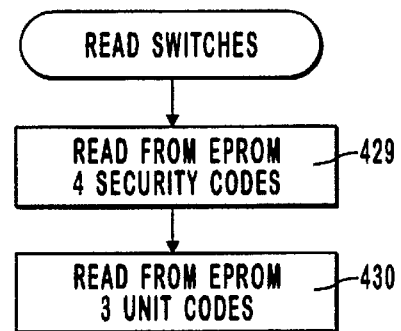
Figure 25:
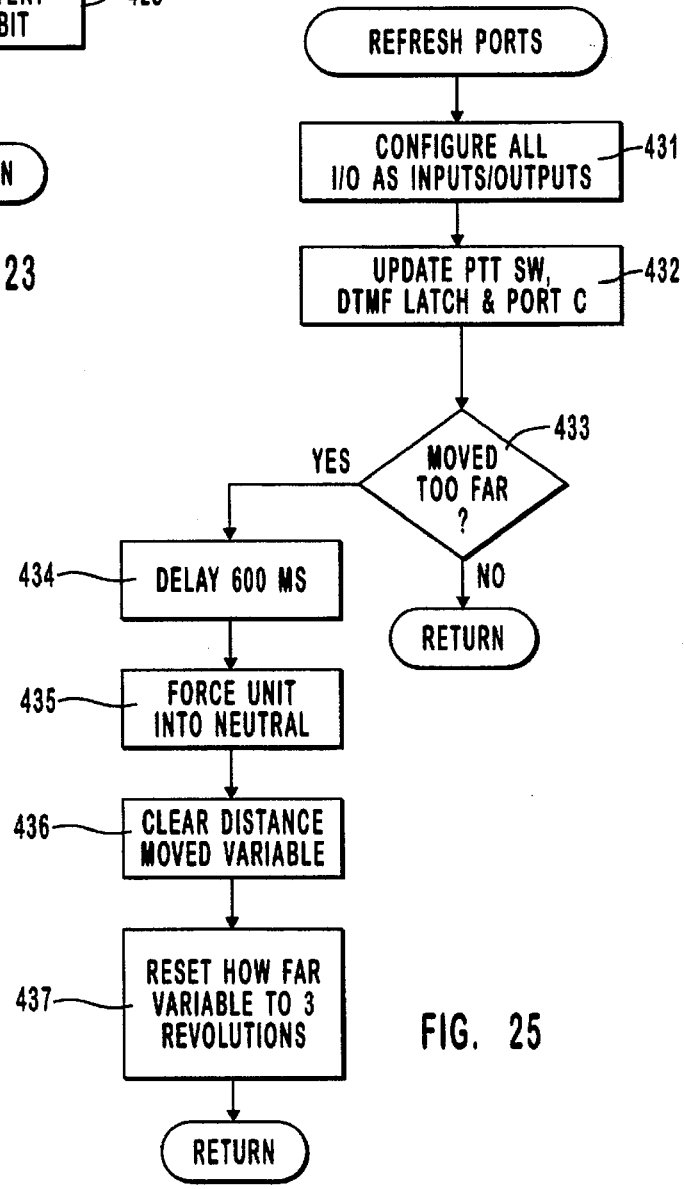

In FIG. 24, the steps 429–430 of reading switches are illustrated. In FIG. 25, the steps 431–437 for refreshing the input/output ports, as is called for in step 404 of FIG. 20 for example, are illustrated.

Figure 26:
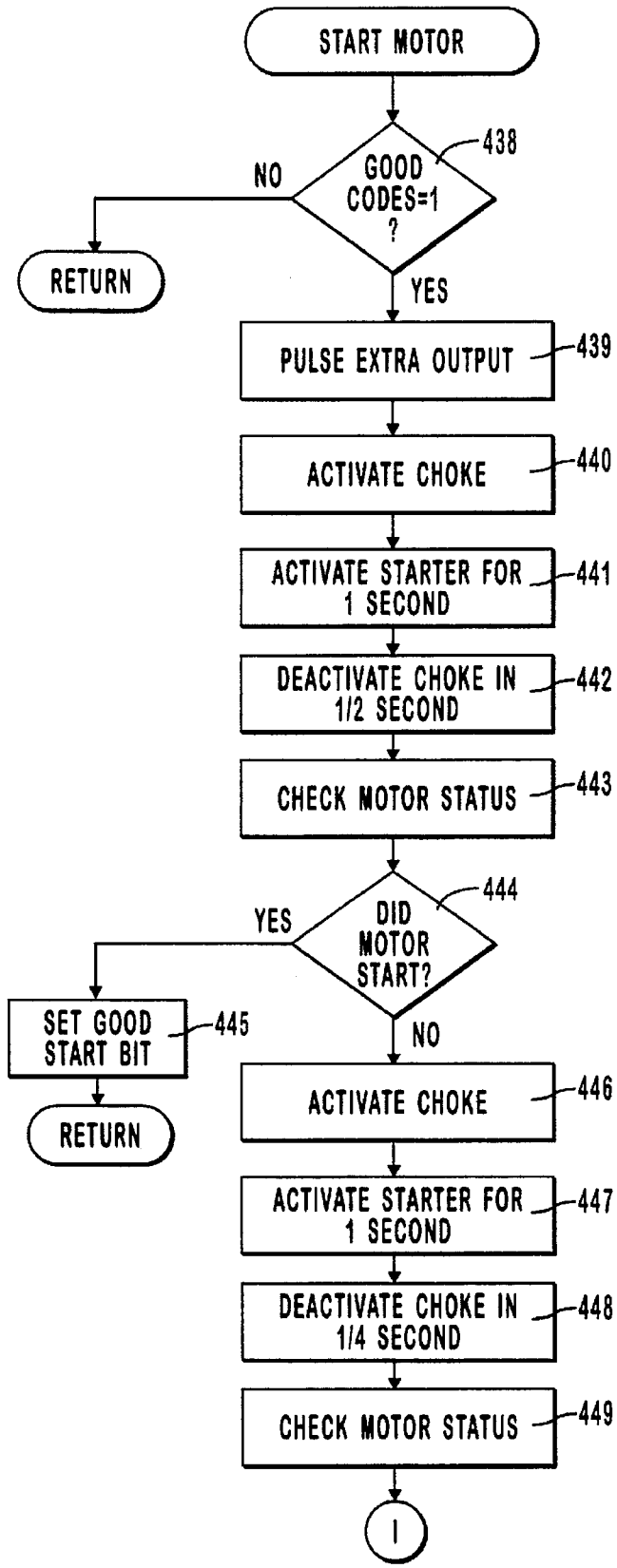

In FIG. 26, the steps for starting the motor are illustrated. In step 438, the question is asked whether the good codes=1. If yes, step 439 pulses extra output and step 440 activates the choke. Step 441 then activates the starter for 1 second and step 442 deactivates the choke in ½ second. In step 443, the motor status is checked. If step 444 answers that the motor did start, then step 445 sets the good start bit. If the motor did not start, then step 446 activates the choke again. Step 447 activates the starter for 1 second and step 448 deactivates the choke in ¼ second. In step 449, the motor status is checked again.

Figure 26A:
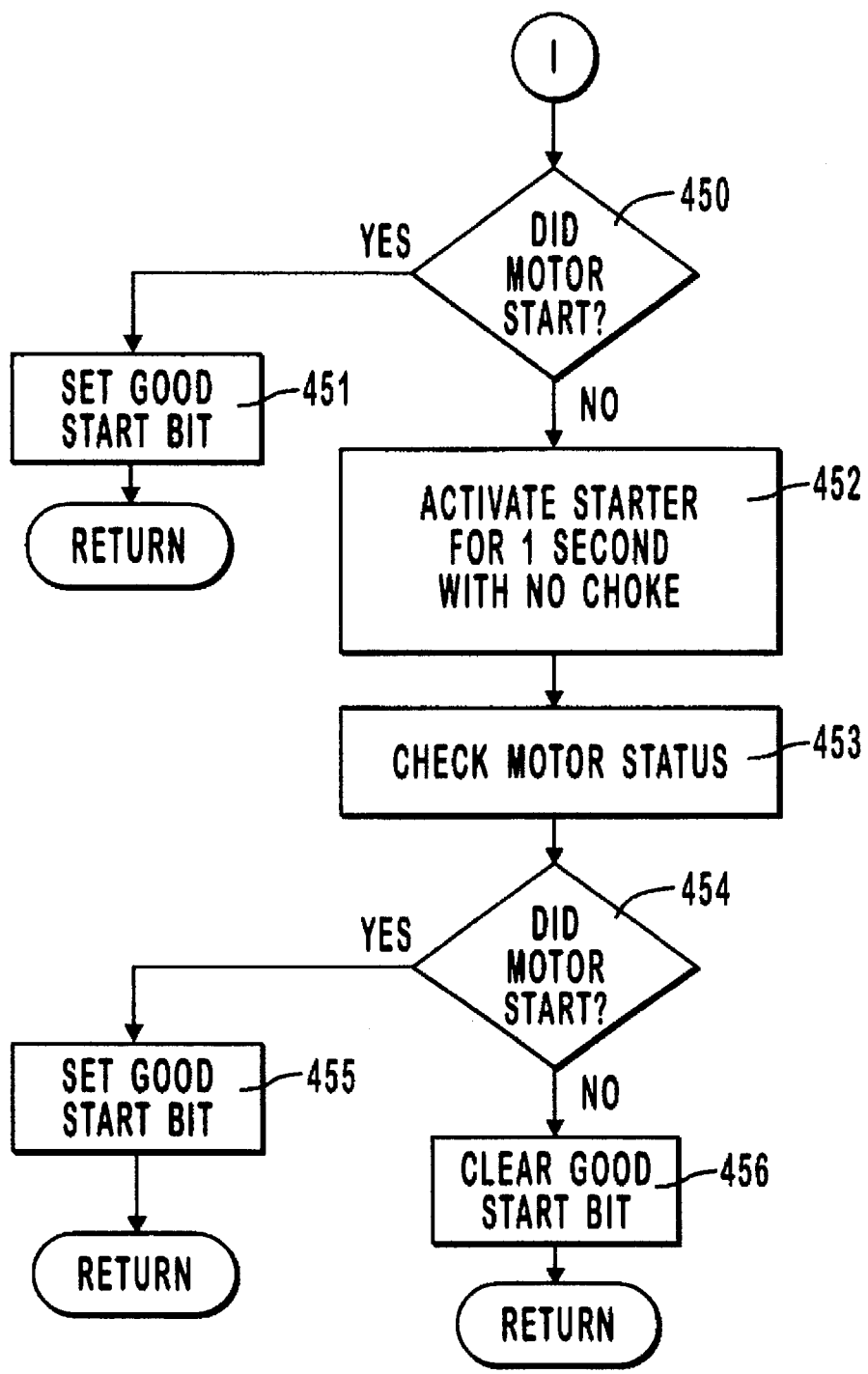

The flow chart of step 50 is continued on FIG. 26A. If step 450 determines that the motor did start, then step 451 sets the good start bit. If the motor did not start, then step 452 activates the starter for 1 second with no choke and step 453 checks again the motor status. If step 454 determines that the motor did start, step 455 sets the good start bit. If the motor did not start, step 456 clears the good start bit.

It can be seen that the flow charts of FIGS. 14–26 are interrelated and must be used and studied together.

It should also be apparent that the programming of primary microprocessor 50 may be readily changed or modified so as to delete and/or modify existing functions and/or add additional functions to the system. For example, if speech synthesis circuitry is combined with the controlling means, then the programming of primary microprocessor 50 could be readily changed to return spoken messages in a language of choice to the controlling means as opposed to returning DTMF tones.

MODIFICATIONS TO THE FARMING DEVICES

The present invention can be used on specially built farming devices or can be retrofit onto farming devices already being used. For example, some changes have been made to the wheel-line devices already presently being used in order to fit the present invention to the apparatus. For example, the engine, which at present is a pull start engine, has been changed to be electric start. The hydraulic valve has been changed from manual solenoid to electric solenoid driven. The 12 volt battery has been changed to electric start. An automatic choke has been installed. It can be appreciated that other changes from manual to electrical must be made so as to allow remote control of the device through the DTMF tones of the present invention. These changes would be known to one with ordinary skill in the art.

Although the wheel-line apparatus has been mainly discussed as the system in use with the present invention, other farming apparatus can also be used. For example, another use for the automatic farming system of the present invention is to automatically turn on and off pump stations. The receiving means can be programmed to turn on and off the pump stations when needed. It can also be programmed to notify an operator through the hand-held radio or other transmitting means when a particular pump station has been turned off and needs to be restarted. Thus, when the pump stations are accidentally turned off during storms or power fluctuations, a person would not have to rush to each pump station to manually restart each before the water pressure drops too low. With the present invention, each pump station can be turned on from a central location through DTMF tones sent by the hand-held radio or other transmitting means to the receiving means on the power plants. The receiving means receive the directions carried in the DTMF tones and can then automatically restart the pumps.

It can be seen that the present invention saves many man hours and personal labor. Various farming devices can be operated from locations away from the devices, thus saving the travel time and inconvenience.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A remotely controlled moveable wheel-line irrigation apparatus comprising;

a conduit, removably coupled to and in fluid communication with a water source;

a plurality of drive wheels spaced at regular intervals, the plurality of drive wheels supporting the conduit for transporting the moveable wheel-line irrigation apparatus;

a motor coupled to one or more of the plurality of drive wheels, with a battery electrically connected to the motor for providing power to start the motor;

a plurality of sprinklers, mounted on, and in fluid communication with, the conduit;

receiving means coupled to one or more of the plurality of drive wheels and implementing directions such that operation of the moveable wheel-line apparatus can be controlled from a location remote from the moveable wheel-line apparatus;

transmitting means for monitoring and directing the operation of the moveable wheel-line apparatus from a remote location; and monitoring means for remotely monitoring the charge levels of the battery.

2. The apparatus of claim 1 further comprising means for recharging the battery by the power plant in response to instructions from the operator through the transmitting means.

3. An apparatus for remotely controlling a moveable wheel-line irrigation device comprising:

a. receiving means integrated into a power plant of the moveable wheel-line irrigation device for receiving and implementing directions sent in radio linked Dual Tone Multiple Frequency tones such that operation of the moveable wheel-line irrigation device can be controlled;

b. transmitting means for transmitting directions to the receiving means from a remote location by means of transmission and reception of radio linked Dual Tone Multiple Frequency tones;

c. sensor means on the wheel-line irrigation device for monitoring the distance traveled by the wheel-line irrigation device;

d. means in conjunction with the receiving and transmitting means for relaying by radio linked Dual Tone Multiple Frequency tones the distance traveled by the wheel-line irrigation device to an operator at a remote location; and e. a power plant located on the wheel-line irrigation device and a battery located on the wheel-line irrigation device for providing power to the power plant and receiving means, the charge level of the battery being capable of being monitored remotely by an operator with the transmitting means, the battery being rechargeable by the power plant in response to instructions from the operator through the transmitting means.

4. A sprinkling wheel-line apparatus which can be remotely controlled comprising:

a. a power plant located on the sprinkling wheel-line apparatus;

b. a transmitting means linked through radio for transmitting directions through Dual Tone Multiple Frequency tones to the sprinkling wheel-line apparatus;

c. receiving means, integrated into the power plant of the moveable irrigation device for receiving and implementing directions sent in Dual Tone Multiple Frequency tones, the receiving means having a microprocessor programmed to monitor the directions transmitted by the transmitting means and control the power plant of the wheel-line device such that the operation of the wheel-line device can be remotely controlled, the microprocessor automatically stopping the forward motion of the wheel-line system after the microprocessor determines the the wheel-line irrigation device has traveled a predetermined maximum distance;

d. sensor means for monitoring the distance traveled by the wheel-line irrigation device;

e. means in conjunction with the receiving and transmitting means for relaying by radio linked Dual Tone Multiple Frequency tones the distance traveled by the wheel-line irrigation device to an operator; and f. a battery located on the wheel-line device to provide power to the power plant and receiving means of the wheel-line device, the charge level of the battery being capable of being monitored remotely by an operator with the transmitting means, the battery being rechargeable by the power plant in response to instructions from the operator through the transmitting means.

* * * * *